Feb. 8, 1927.　　　　　　　　　　　　　　　　1,616,448
A. S. GUSH ET AL
ELECTROLYTIC SYSTEM FOR PROTECTION OF CONDENSERS, TANKS, AND
SUCH LIKE VESSELS AGAINST CORROSION
Original Filed Feb. 3, 1925　　5 Sheets-Sheet 1

INVENTORS
Arthur S. Gush,
Marie C. Gush,
by Bright & Bailey
ATTYS

Feb. 8, 1927. 1,616,448
A. S. GUSH ET AL
ELECTROLYTIC SYSTEM FOR PROTECTION OF CONDENSERS, TANKS, AND
SUCH LIKE VESSELS AGAINST CORROSION
Original Filed Feb. 3, 1925  5 Sheets-Sheet 2
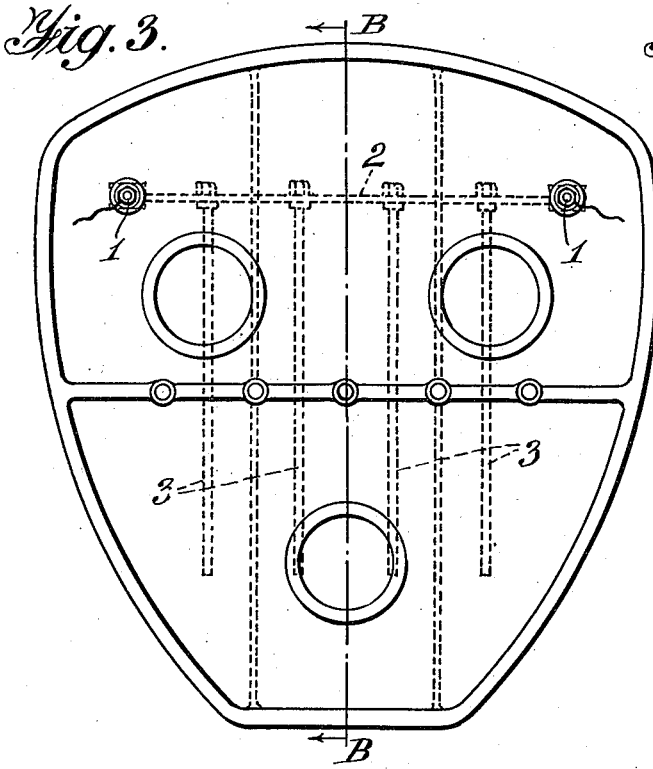
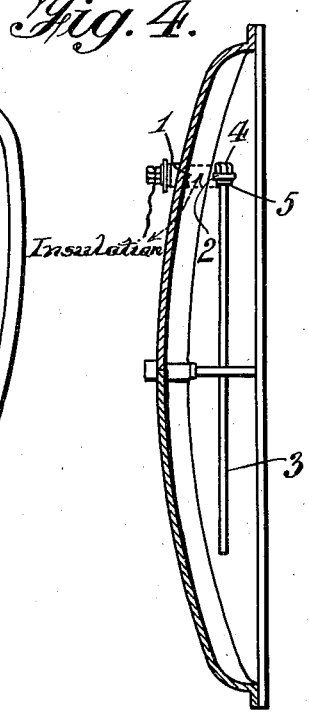
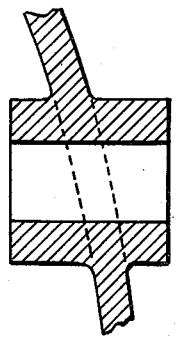
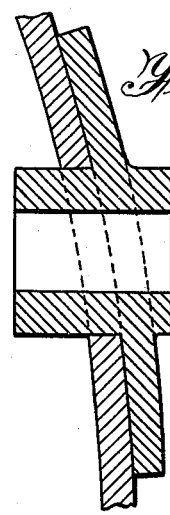
INVENTORS
Arthur S Gush,
Marie C. Gush,
by Bright & Bailey
ATTYS.

Feb. 8, 1927. 1,616,448
A. S. GUSH ET AL
ELECTROLYTIC SYSTEM FOR PROTECTION OF CONDENSERS, TANKS, AND
SUCH LIKE VESSELS AGAINST CORROSION
Original Filed Feb. 3, 1925    5 Sheets-Sheet 3
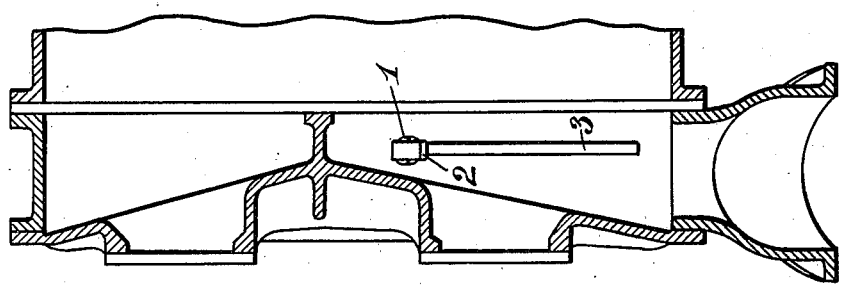
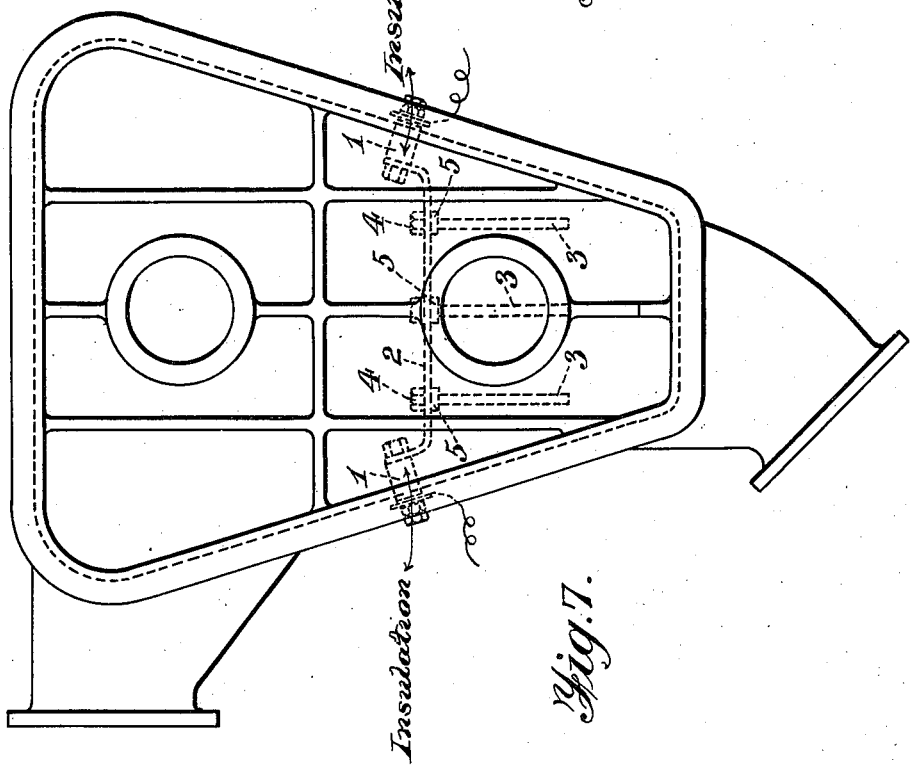
INVENTORS
Arthur S. Gush,
Marie C. Gush,
by Bright & Bailey
Att'ys.

Feb. 8, 1927. 1,616,448
A. S. GUSH ET AL
ELECTROLYTIC SYSTEM FOR PROTECTION OF CONDENSERS, TANKS, AND
SUCH LIKE VESSELS AGAINST CORROSION
Original Filed Feb. 3, 1925   5 Sheets-Sheet 4
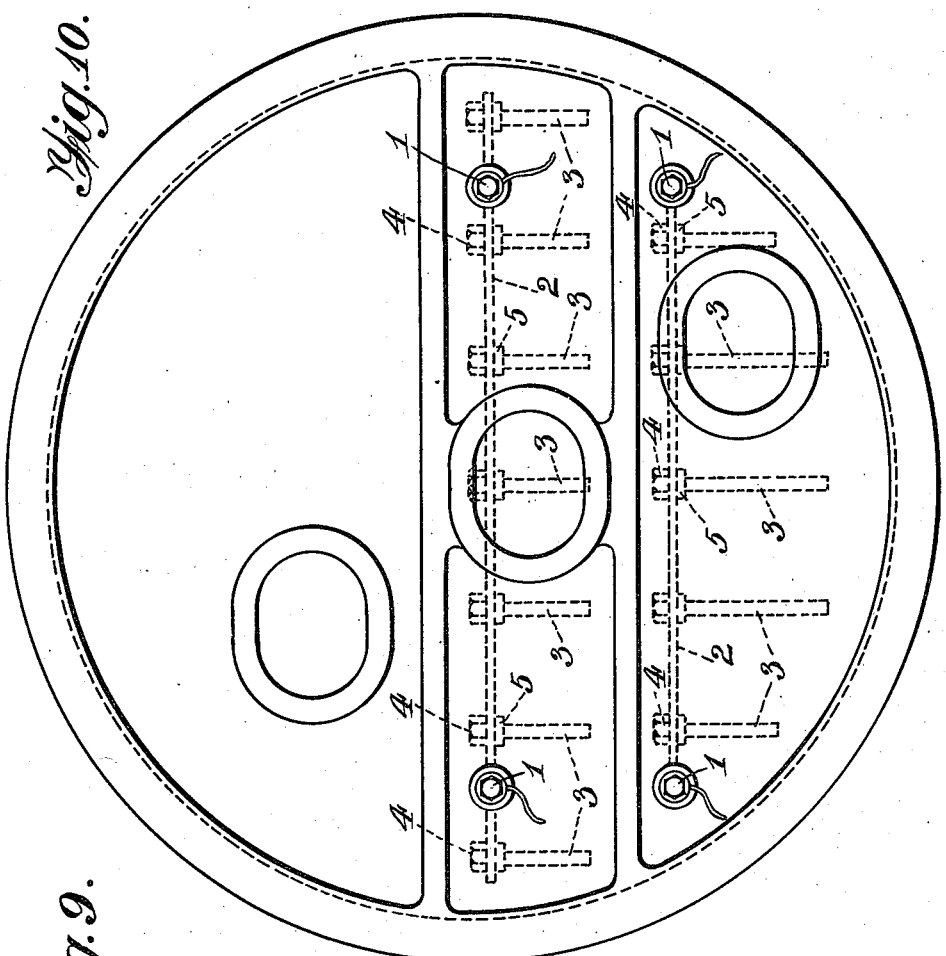
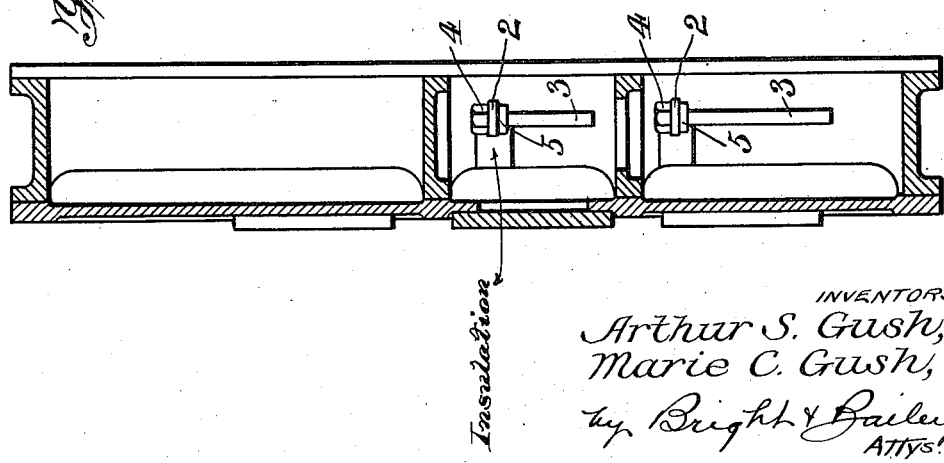
INVENTORS
Arthur S. Gush,
Marie C. Gush,
by Bright & Bailey
ATTYS Feb. 8, 1927. 1,616,448
A. S. GUSH ET AL
ELECTROLYTIC SYSTEM FOR PROTECTION OF CONDENSERS, TANKS, AND
SUCH LIKE VESSELS AGAINST CORROSION
Original Filed Feb. 3, 1925   5 Sheets-Sheet 5
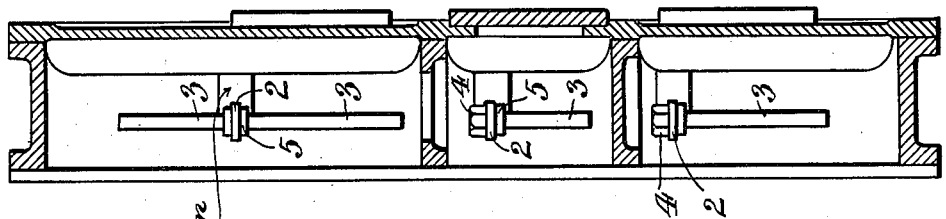
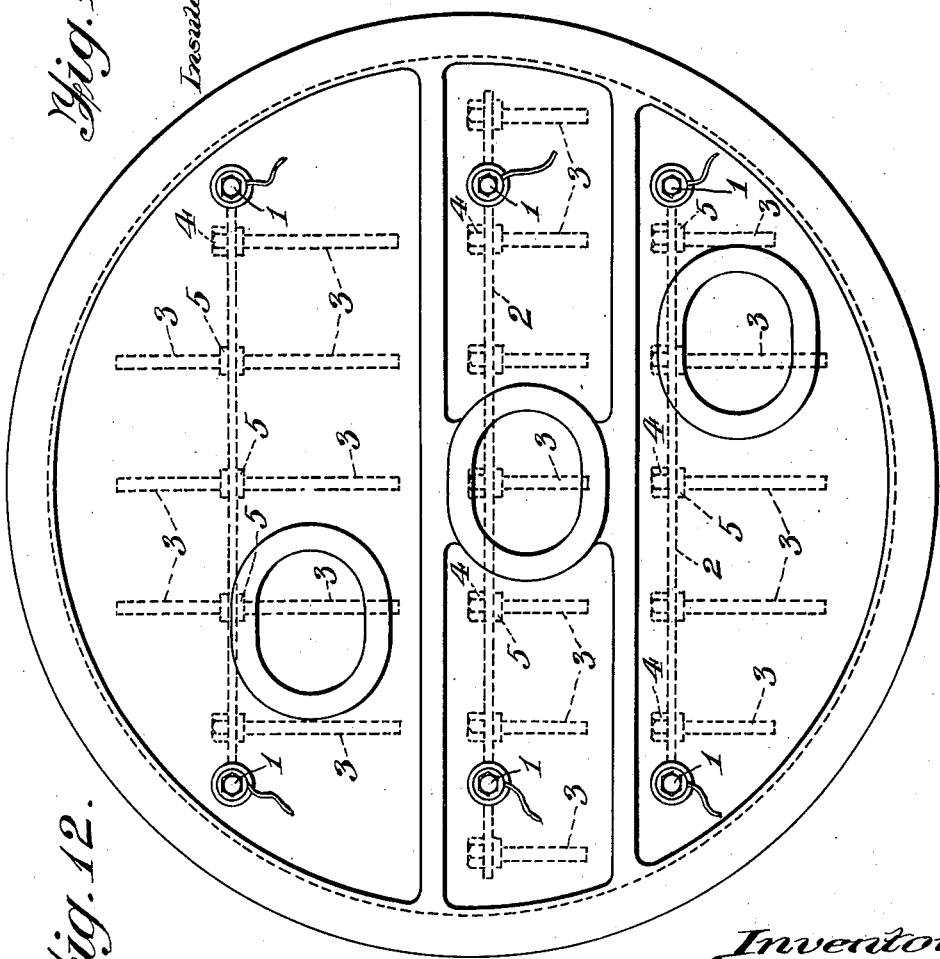
Inventors
Arthur S. Gush,
Marie C. Gush,
by Bright & Bailey
Attys.

Patented Feb. 8, 1927.

1,616,448

UNITED STATES PATENT OFFICE.

ARTHUR SYDNEY GUSH AND MARIE CONSTANCE GUSH, OF HOVE, ENGLAND.

ELECTROLYTIC SYSTEM FOR PROTECTION OF CONDENSERS, TANKS, AND SUCH LIKE VESSELS AGAINST CORROSION.

Application filed February 3, 1925, Serial No. 6,644, and in Great Britain February 12, 1924. Renewed November 8, 1926.

The object of our invention is to improve upon the methods of attachment and disposition of the anodes, as used in condensers and the like.

Hitherto it has been customary to attach anodes, usually consisting of metallic discs to insulated current conveying bolts or insulated currents conveying supports fixed to the sight-hole doors of the condenser main end doors.

The numbers and positions of such sight hole doors, attached to condensers of different design however vary considerably, thereby adding to the difficulty of properly disposing the attached anodes, so as to afford equal or adequate protection over the whole surface area of the condenser tube plates.

It is well known, that in order to obtain the most efficient results from such systems of electrolytic protection the anodes should be situated nearer to the tube plates than to the condenser end doors and that the anodes should all be parallel to and at the same distance from the tube plates In order to obtain the foregoing requisite conditions in connection with many types of condensers now in use, it is essential to mount the anodes on insulated current conveying bolts or insulated current conveying supports of varying lengths and in addition it is often necessary to provide special sight hole doors, for accommodating the anode supports so as to ensure the necessary parallel alignment between the anodes and the tube plate.

Our invention obviates the necessity and the disadvantages of fitting anode supports of varying lengths as well as the provision of special sight hole doors for the accommodation of same.

Broadly this invention is characterized in that the insulated current conveying bolts or the insulated current conveying supports to which the anodes are connected are not attached to the sight hole doors or relatively like movable parts but are disposed in such manner that the movable parts of a condenser or like vessel can be effected without removal or disturbance of the various items which comprise our improved system of protection.

According to the preferred embodiment of this invention the current conveying bolts or insulated supports are fixed to the condenser main end doors on to the walls of circulating water spaces at the ends of the condensers, the insulated supports as fitted to each circulating water section of the condenser being attached to and connected by a common cross bar.

A plurality of anodes are attached to each cross bar and the cross bars may be composed of metal, thereby acting as current conducting mediums to their attached anodes or the cross bars may be composed of a non-conducting medium or partially non-conducting medium such as wood, in which case the current is conveyed from the insulated current conveying supports to the anodes by means of a separate conductor carried by the non-conducting cross bar.

The anodes which perferably consist of iron rods or bars are bolted or secured at intervals to and transversely across the cross bars and adjacent sets of anodes may be arranged in stepped formation so as to be evenly distributed over the cross sectional surface area of each particular section of the tube plate.

In order that this invention may be more readily understood applications of an embodiment of it are shown by the accompanying four sheets of drawings, wherein:—

Fig. 3 is an end view of the common flow end.

Fig. 4 is a section on the line B—B of Fig. 3.

Fig. 5 is a sectional view of a suitable form of boss made integral with a wall of a condenser for supporting an insulated bolt.

Fig. 6 shows in section how a similar boss can be effectively applied to existing condensers or the like.

Figs 7 and 8 show end and sectional side elevation of the inlet and outlet circulating water spaces of a condenser.

Figs. 9 and 10 are sectional side and end elevations of the inlet second stage and outlet spaces as arranged a three stage condenser, and Figs 11 and 12 are similar views of the common flow spaces arranged at the other end of the same condenser.

Figure 1:
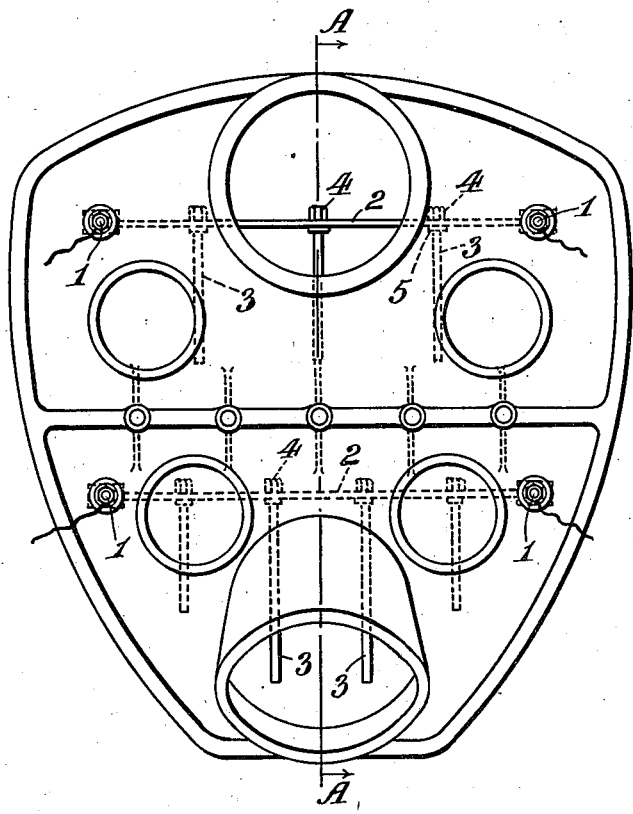
Fig. 1 is an end view of the inlet and outlet end of a condenser.
Figure 2:
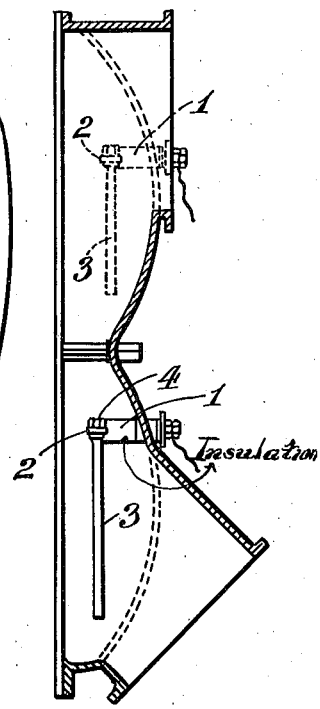
Fig. 2 is a section of the end plate on the line A—A of Fig. 1.

In all of the embodiments or applications of our invention shown by the accompanying drawings it will be seen that current conveying bolts or current conveying insulated supports 1 are provided to support a cross bar 2 extending across the circulating water spaces of the condenser or other apparatus to which the principle of electrolysis is applicable.

In all illustrations attached the cross bars shown consist of metal and therefore act as current conductors to the attached anodes, but as previously stated such cross bars may be composed of a non-conducting or partially non-conducting medium containing a separate conductor.

The anodes 3 are shown made from rod iron of circular section, with their attachment ends threaded and passed through holes in the bars 2, and secured thereto by means of the nuts 4, an abutment or collar 5 being provided on the anode whereby each anode is clamped in position. When the cross bars 2 consist of a non-conducting medium the nuts 4, or additional nuts, may constitute electrical connections to the anodes as well as means for supporting same.

It will be apparent by referring to the drawings that where the contour of the shell of a condenser permits the anodes may be of varying lengths in order to cover as large a surface area as possible. For instance when the ends of the anodes are near a circular or sloping wall, the lengths of the anodes may vary so that they appear to be in stepped formation. Alternately the bar 2 may be curved or otherwise shaped to correspond with the configuration of the vessel within which it is accommodated or in accordance with the positions of the insulated supports 1, Fig. 7.

By means of our invention and when it is desired to inspect the interior of the condenser or its equivalent this may be done by removal of the usual sight hole doors or by removal of the condenser end doors without removal or disturbance of the insulated supports 1, the cross bars 2, or the attached anodes 3.

Further an appreciable economy in the number of insulated supports used is effected by our invention owing to the symmetrical disposition and number of anodes which can be attached to one cross bar extending between two insulated supports while risk of damage to the insulated supports which is at present not uncommon is obviated owing to it being unnecessary to remove same when interiors of condensers are examined, as already stated.

What we claim is:—

1. In an electrolytic system, a condenser, a conductor bar affixed within said condenser and insulated therefrom, anodes carried by said bar, said condenser having an opening therein through which access may be had to said conductor bar and anodes, and a closure for said opening, said bar being affixed to parts of the condenser separate from said closure whereby the latter may be manipulated without disturbing said bar and anodes.

2. In an electrolytic system, the combination with a condenser having a removable head provided with a sight hole and a removable door normally closing said sight hole; of a conductor bar fastened rigidly between parts of said head apart from said doors, whereby the latter may be removed and replaced without disturbing said bar, said bar being insulated from said head, and anodes carried by said bar.

In witness whereof we have signed this specification.

ARTHUR SYDNEY GUSH.
MARIE CONSTANCE GUSH.